May 7, 1946.  F. H. BOGART  2,399,622
WORK GRIPPING DEVICE
Original Filed June 7, 1941  3 Sheets-Sheet 1
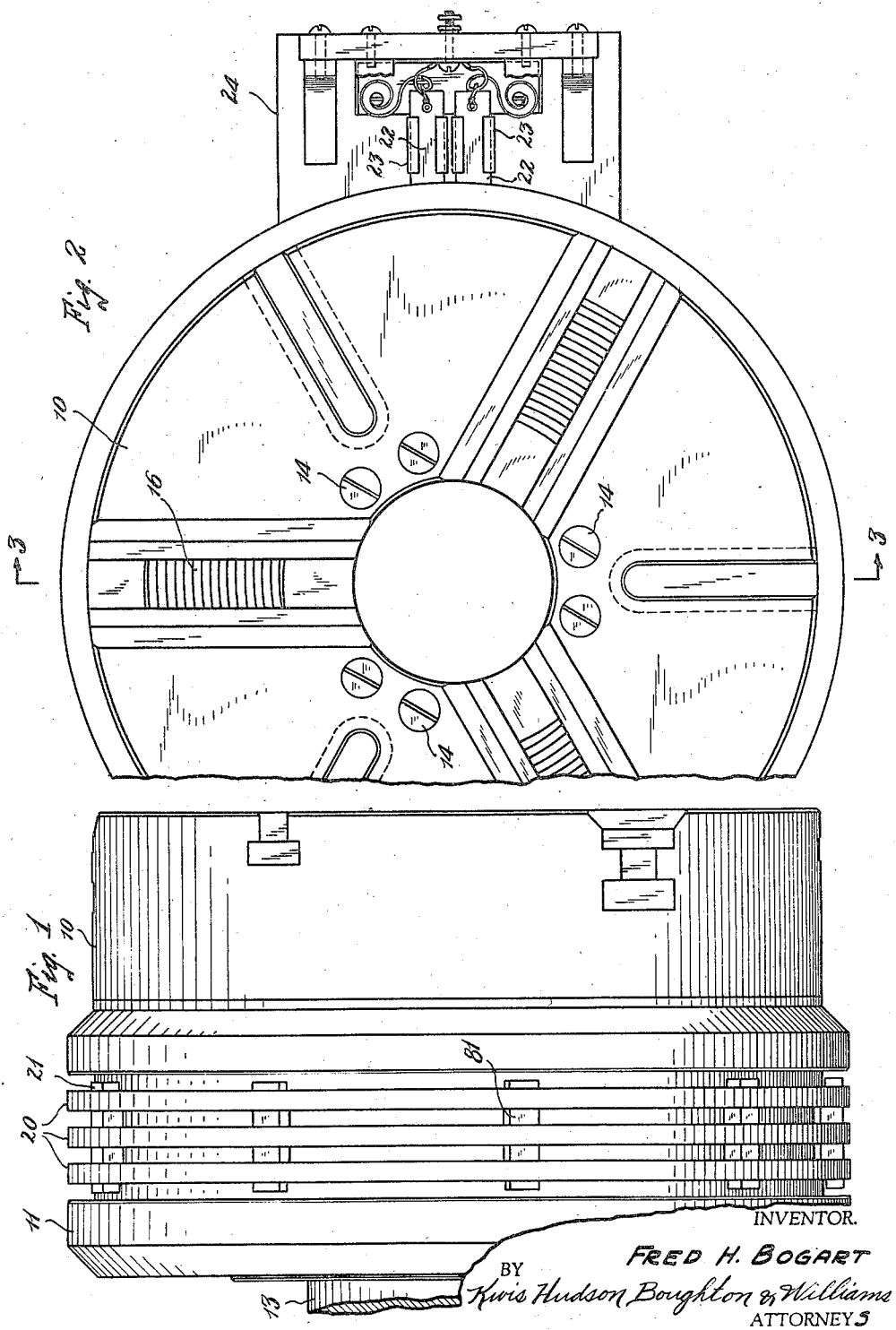
INVENTOR.
FRED H. BOGART
BY Kwis Hudson Boughton & Williams
ATTORNEYS

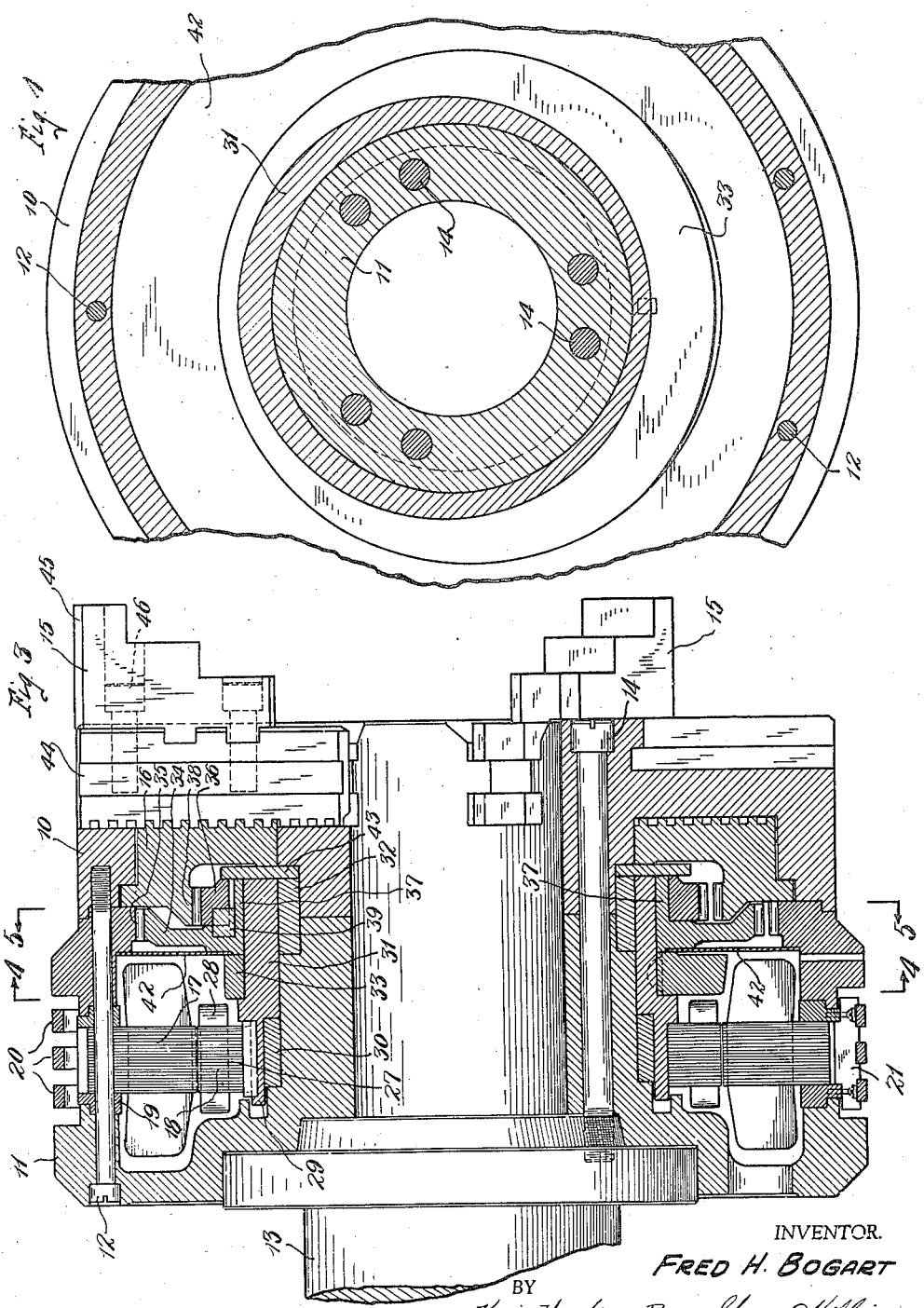

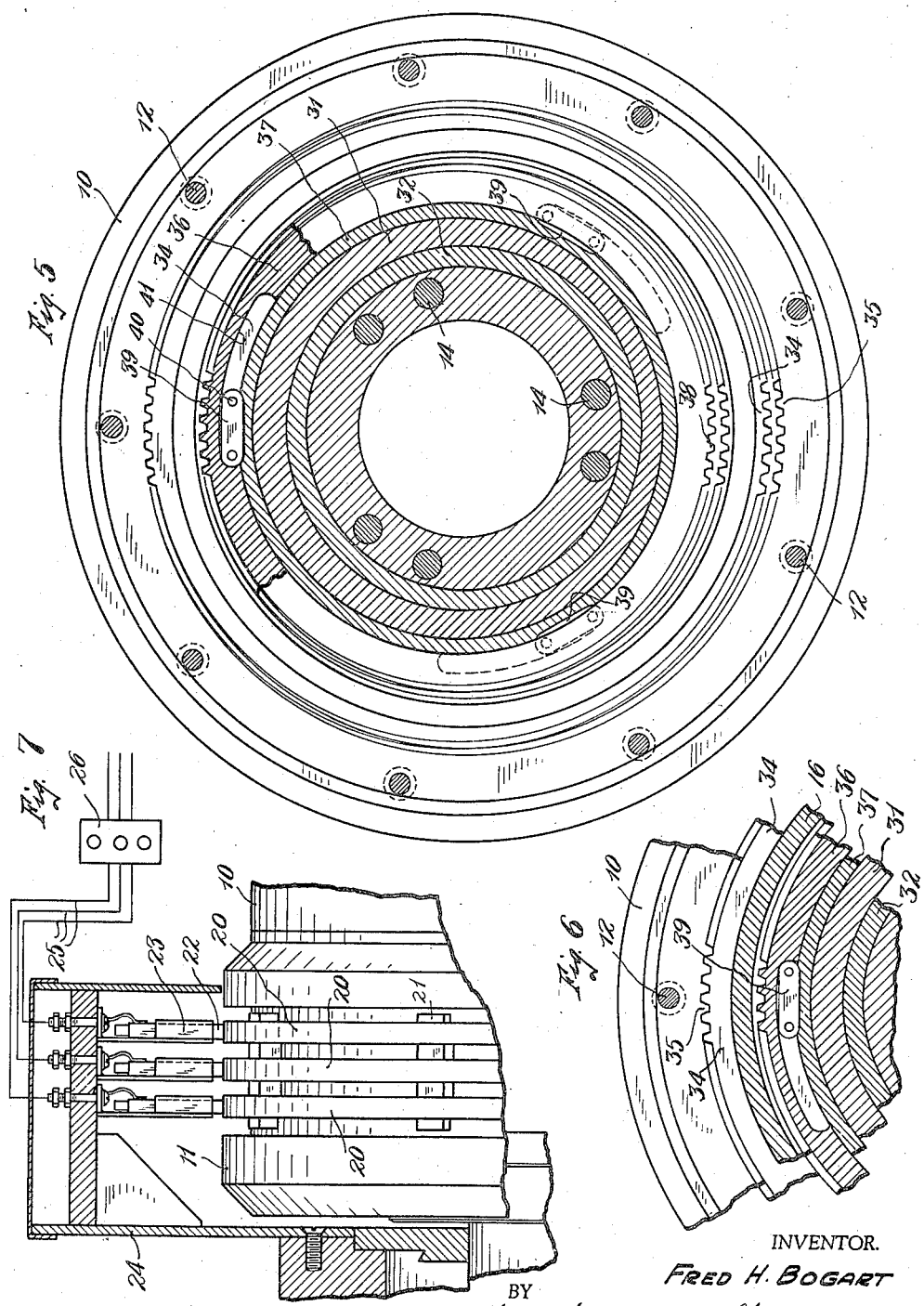

Patented May 7, 1946

2,399,622

UNITED STATES PATENT OFFICE 2,399,622

WORK GRIPPING DEVICE

Fred H. Bogart, South Euclid, Ohio, assignor to The Warner & Swasey Company, Cleveland, Ohio, a corporation of Ohio Original application June 7, 1941, Serial No. 397,145, now Patent No. 2,358,049, dated September 24, 1944. Divided and this application May 5, 1944, Serial No. 534,263

4 Claims. (Cl. 279—114)

This invention relates to a work gripping device such as a chuck for a machine tool and has particular reference to mechanism for actuating the work gripping members thereof such as the movable work gripping jaws.

This application is a division of my copending application Serial No. 397,145, filed June 7, 1941, now issued as Patent No. 2,358,049, September 24, 1944.

The principal object of the invention is to provide a power operated work gripping device wherein there is substantially maximum increase in leverage between the power driven actuating member and the part or parts which move the work gripping member or members to and from work gripping position.

Another object is to provide a power operated work gripping device such as specified in the first named object and wherein an electric motor is built into the body of the device and the rotor of said motor is operatively connected with the work gripping member or members by the mechanism that provides the said increase in leverage between the power driven actuating member and the part or parts which move the work gripping member or members.

Further and additional objects and advantages will become apparent in the detailed description which is to follow.

Referring to the accompanying drawings,

Fig. 1 is a side elevational view of the work gripping device which in this instance is a chuck mounted on the work spindle of a machine tool.

Fig. 2 is a fragmentary front elevational view of the chuck shown in Fig. 1.

Fig. 3 is a transverse sectional view taken along the line 3—3 of Fig. 2 looking in the direction of the arrows.

Fig. 4 is a transverse sectional view along the line 4—4 of Fig. 3 looking in the direction of the arrows.

Fig. 5 is a transverse sectional view along the line 5—5 of Fig. 3 looking in the direction of the arrows.

Fig. 6 is a fragmentary sectional view of a portion of Fig. 5 but with the parts in a different position than that shown in Fig. 5, and Fig. 7 is a view, partly in section and partly in elevation, showing a portion of the chuck illustrated in Fig. 1 and some of the electrical contacts employed in the motor circuit and also showing in section the support for the contacts.

Referring to the drawings, the chuck illustrated therein comprises a body composed of a front portion 10 and a rear portion 11 which are secured together by bolts 12, this chuck body being secured to the rotating spindle 13 of a machine tool by bolts 14 which cooperate with the bolts 12 in holding the front and rear portions of the chuck body together. At the front of the chuck body are reversible type jaws 15 which move inwardly and outwardly in radial slots and are actuated by a rotatable scroll 16 having threaded operative relation with the rear faces of the jaws.

The operating motor herein illustrated is carried by the chuck body and includes a stator 17 and a rotor 18. Although the motor may be of various types it is shown herein for purposes of illustration as a three-phase induction type motor. The stator 17 includes a laminated body which may carry a winding with the laminae held together between two pilot washers 19 which are clamped together between the front and rear portions of the chuck body by the bolts 12. Current is carried to the three-phase winding of the stator through the medium of slip rings 20 which are mounted on a series of circumferentially spaced insulating strips 21, which, as indicated in Fig. 3, are secured to the pilot rings 19. These slip rings are engaged by suitable brushes 22 mounted in brush holders 23 carried by a support 24 attached to the headstock of the lathe or other machine tool of which the spindle 13 is a part. The brushes 22 are aligned with and at all times engage the rings 20. Current will be supplied to these brushes by conductors 25 in which is provided a switch 26 which will be located on the machine in convenient reach of the operator when he is standing in front of the machine and said switch will control the forward and reverse rotations of the motor.

The rotor 18 includes a laminated core 27 and may have a winding 28 with the core keyed to a sleeve 29, the radial thrust of which is taken by a hardened ring 30 which is secured to the rear portion 11 of the chuck body. The sleeve 29 projects forwardly beyond the rotor of the motor and this has an eccentric portion 31 as clearly shown in Fig. 3. Beneath this eccentric portion is another hardened steel ring 32 to take the radial thrust of this portion of the sleeve.

Keyed or otherwise secured to the eccentric portion 31 of the sleeve 29 is a balancing disk 33 which is an eccentric member having an eccentric portion disposed in the opposite direction from the eccentric portion 31 of the sleeve 29. Thus the eccentricity of the eccentric portion 31 of the sleeve 29 will be counterbalanced so as to provide for smooth high speed rotation of the chuck.

Rotatably mounted on the eccentric portion 31 of the sleeve 29 is a gear 34 which is in meshing relation with a relatively fixed gear 35 which is carried by the forward portion 10 of the chuck body concentrically with the axis thereof. This gear 35 is arranged outwardly of the gear 34 and the number of teeth of this gear is one or more greater than the number of teeth of the gear 34. The teeth of gear 35 are formed on its inner periphery and several of the teeth of this gear are always in mesh with several of the externally formed teeth of the eccentrically mounted gear 34. It will be apparent that the gear 34 has gyratory action with respect to the gear 35 and at each rotation of the eccentric 31 the gear 34 is given rotative movement equivalent to the difference in the number of teeth in the gears 34 and 35.

It will be noted that in this instance the inner gear 34 is given a rotative movement even though it has a gyratory or wobbling action and therefore the movement of the gear 34 may be said to be an epicyclic movement.

The rotary movement of the gear 34 is transmitted to an externally toothed gear 36 located adjacent to it. This gear 36 rides on the surface of a sleeve-like portion 37 of the gear 34. The gear 36 in turn meshes with an internally toothed gear 38 formed on a portion of the scroll. Thus the slow rotation of a few degrees imparted to the gear 34 at each rotation of the eccentric 31 is transmitted to the gear 36 and this causes the slow rotation of the scroll which, as before stated, actuates the jaws with a force having a very high leverage action with respect to the rapidly rotating motor driven eccentric 31.

While the rotative movement of gear 34 is imparted to gear 36 there is a lost motion connection between the two by which a hammer blow will be imparted to the gear 36 and therefore to the gear 38 and the scroll 16. This is accomplished by securing to recessed portions of the gear 34 a series of circumferentially spaced driving dogs 39 which may be secured to the gear 34 by pins 40 or otherwise and which extend into segmental slots 41 formed in the adjacent face of the gear 36. Thus while the dogs 39 are traveling lengthwise through the slots 41 no motion will be transmitted to the gear 36 until the forward ends of the dogs reach the ends of the grooves 41.

As it may be desired to provide lubricant for the gears 34, 35, 36 and 38 these gears are enclosed in the equivalent of a chamber which is separated from the motor by a shield 42. The lateral thrust on the scroll 16 is taken by a hardened steel thrust washer 43 which engages also the gear 36 and keeps it in proper position with respect to the gears 34 and 38. The term "jaw" as used in the description and as illustrated herein applies to composite jaws consisting of slides 44 which may be I-shaped in cross-section as is customary in the art, and detachable portions 45 which are held shown as secured to the slides by screws 46.

It will be seen that the motor built into the chuck body drives an eccentric which imparts a wobbling action to a gear that rotates relative to a non-rotating gear with which it is in meshing relation. It will be seen further that the wobbling gear forms one element of high reduction gearing between the eccentric and the scroll so as to transmit to the latter and therefore to the chuck jaws a force having a very high leverage action with respect to the power driven eccentric. Likewise it will be seen that the force is applied through a lost motion connection by which a hammer blow may be imparted to the scroll.

Although a single embodiment of the invention is illustrated and described in this application it will be understood that the invention is susceptible of various modifications and adaptations within the scope of the appended claims.

Having thus described my invention, I claim:

1. In a chuck of the type having a chuck body provided with a central hub portion, a motor housed in said body with the stator thereof fixed with respect to said body and the rotor rotatable relative thereto and concentric to said hub portion, radially movable jaws carried by said body, and operative connections between said motor and said jaws; said operative connections including a sleeve concentrically and rotatably supported by said hub portion of said body and having said motor rotor fixed thereto and provided with an eccentric portion, a pair of external gears of different diameters rotatably carried by the eccentric portion of said sleeve, a lost motion operative connection between said external gears, an internal gear fixed with respect to said body and meshing with one of said external gears, a scroll rotatable relative to said body and operatively connected with said jaws, and an internal gear operatively connected with said scroll and meshing with the other of said external gears.

2. In a chuck of the type having a chuck body provided with a central hub portion, a motor housed in said body with the stator thereof fixed with respect to said body and the rotor rotatable relative thereto and concentric to said hub portion, radially movable jaws carried by said body, and operative connections between said motor and said jaws; said operative connections including a sleeve concentrically and rotatably supported by said hub portion of said body and having said motor rotor fixed thereto and provided with an eccentric portion, a pair of external gears of different diameters rotatably carried by the eccentric portion of said sleeve, one of said external gears being provided with a segmental recess and the other of said external gears being provided with a segmental key portion shorter than the length of said recess and engaging therein, wherefore said gears are operatively interconnected with a lost motion connection, an internal gear fixed with respect to said body and meshing with said external gear of shorter diameter, a scroll rotatable relative to said body and operatively connected with said jaws, and an internal gear operatively connected with said scroll and meshing with said external gear of lesser diameter.

3. In a chuck of the type having a chuck body provided with a central hub portion, a motor housed in said body with the stator thereof fixed with respect to said body and the rotor rotatable relative thereto and concentric to said hub portion, radially movable jaws carried by said body, and operative connections between said motor and said jaws; said operative connections including a sleeve concentrically and rotatably supported by said hub portion of said body and having said motor rotor fixed thereto and provided with an eccentric portion, a pair of external gears of different diameters rotatably carried by the eccentric portion of said sleeve, a lost motion operative connection between said external gears, an internal gear fixed with respect to said body and meshing with one of said external gears, a scroll rotatable relative to said body and operatively connected with said jaws, an internal gear operatively connected with said scroll and meshing with the other of said external gears, and means fixed to said sleeve and counterbalancing the unbalanced part of said eccentric portion of said sleeve and the unbalanced parts of both of said external gears carried by said eccentric portion.

4. In a chuck of the character described a chuck body comprising two separable parts each provided with a central hub portion, a pilot ring carried in part by each of said hub portions and acting to axially align said portions, securing means extending through said hub portions to rigidly connect the same in axially aligned relationship, one of said parts supporting radially movable chuck jaws, said parts forming a chamber housing a motor and the operative connections between said motor and said jaws for actuating the latter, the stator of said motor being fixed with respect to said body and the rotor thereof rotatable relative thereto, and securing means interconnecting said body parts and passing through said stator.

FRED H. BOGART.